Feb. 11, 1936.  J. J. MURTAUGH, JR  2,030,313
DEPOSITORY
Filed Oct. 3, 1934    9 Sheets-Sheet 1
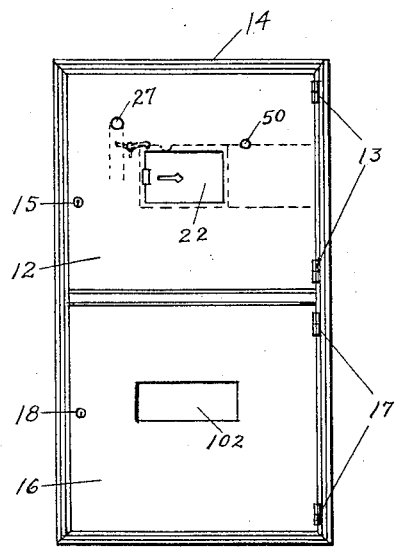
FIG.2
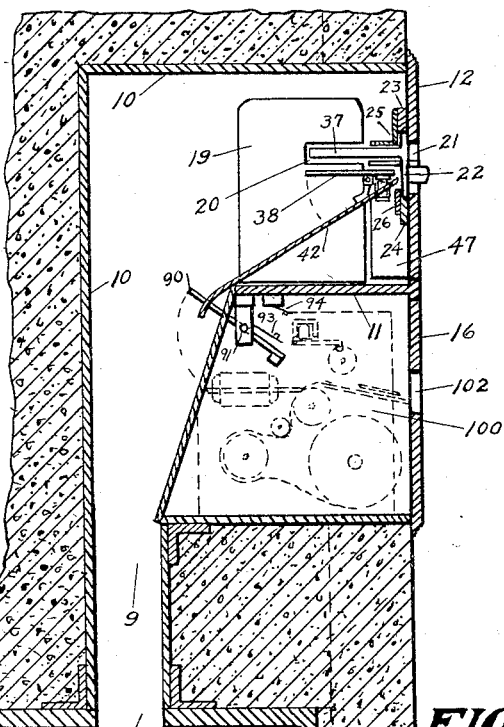
FIG.1
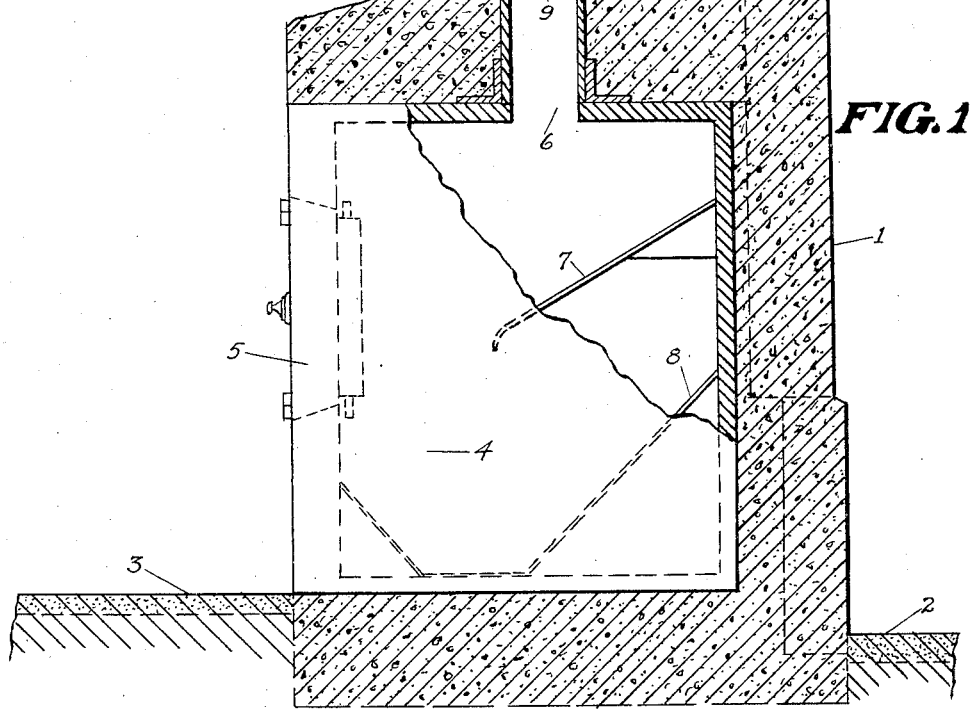
INVENTOR
John J. Murtaugh Jr.
BY Henry Van Arsdale
his ATTORNEY Feb. 11, 1936.    J. J. MURTAUGH, JR    2,030,313
DEPOSITORY
Filed Oct. 3, 1934    9 Sheets-Sheet 2

INVENTOR
John J. Murtaugh Jr.
BY Henry Van Arsdale
his ATTORNEY

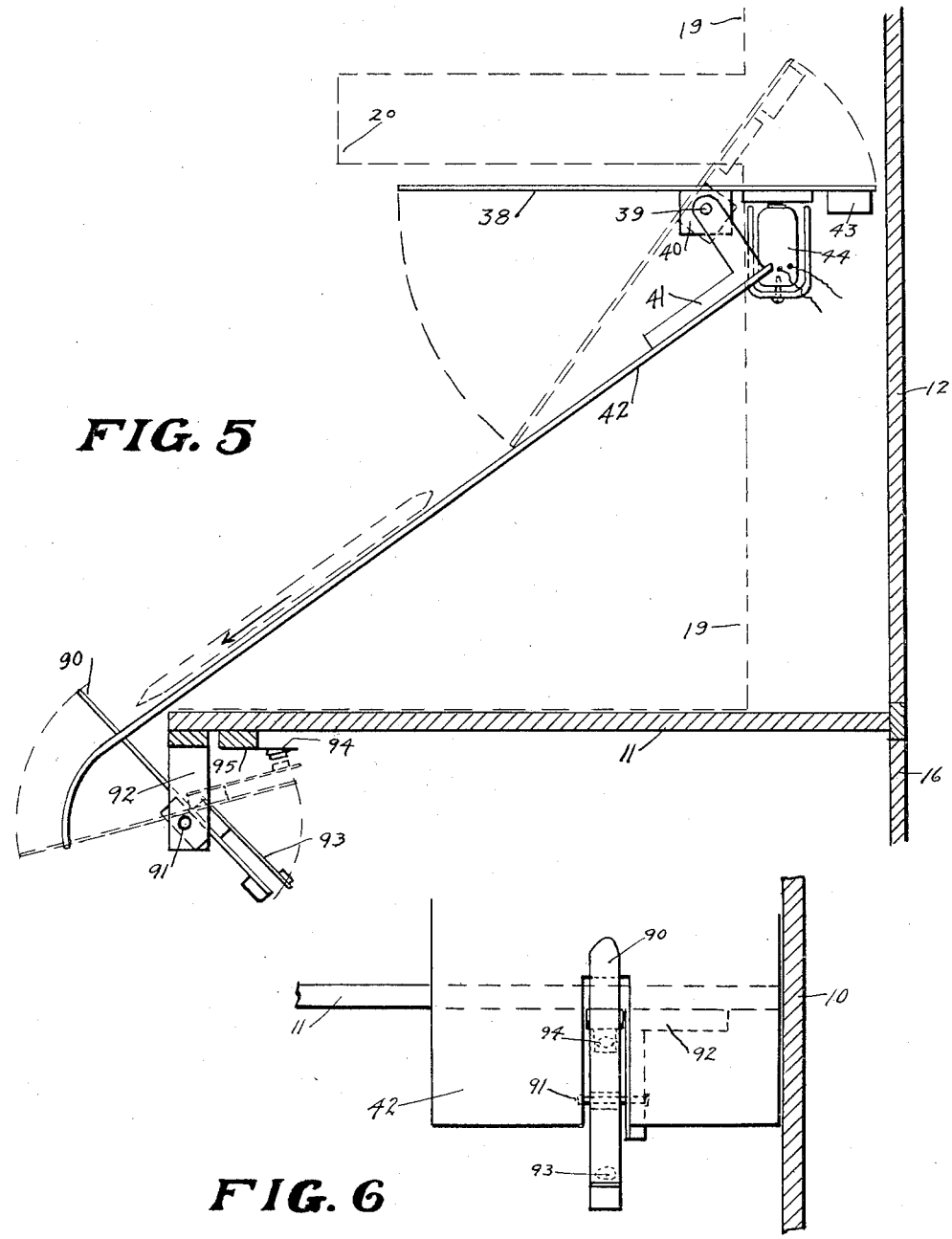

Feb. 11, 1936. J. J. MURTAUGH, JR 2,030,313
DEPOSITORY
Filed Oct. 3, 1934   9 Sheets-Sheet 5
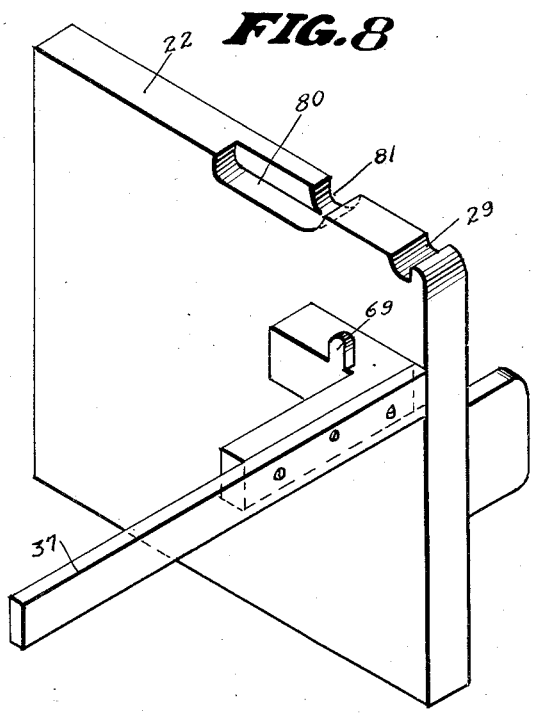
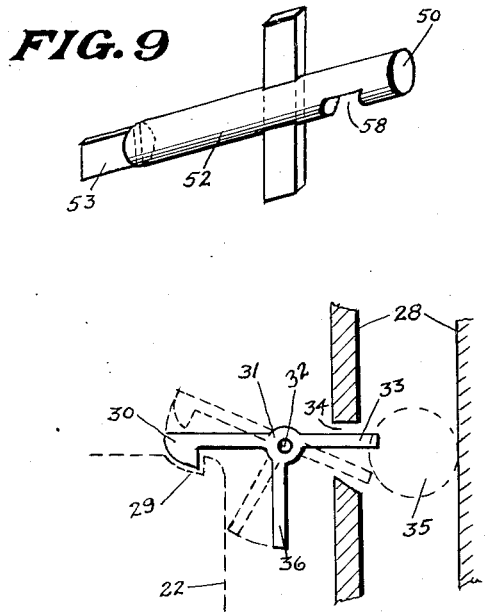
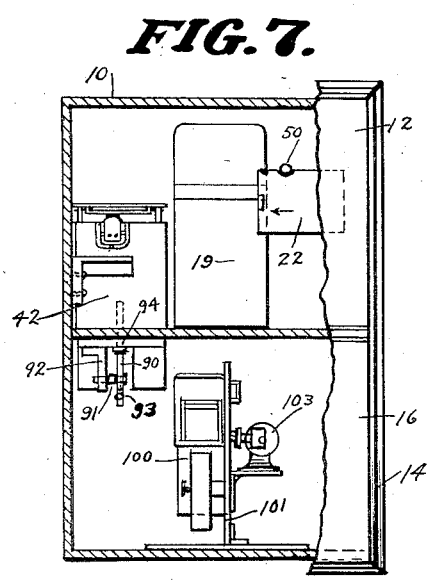
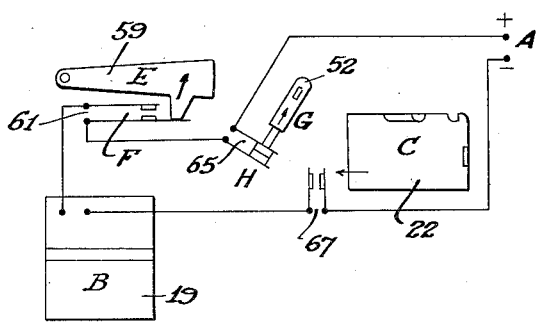
INVENTOR
John J. Murtaugh Jr.
BY
Henry Van Arsdel
ATTORNEY Feb. 11, 1936.  J. J. MURTAUGH, JR  2,030,313
DEPOSITORY
Filed Oct. 3, 1934  9 Sheets-Sheet 6

INVENTOR
John J. Murtaugh Jr.
BY
Henry Van Arsdale
his ATTORNEY

Feb. 11, 1936.  J. J. MURTAUGH, JR  2,030,313
DEPOSITORY
Filed Oct. 3, 1934  9 Sheets-Sheet 7

INVENTOR
John J. Murtaugh Jr
BY
Henry Van Arsdale
his ATTORNEY

Feb. 11, 1936.  J. J. MURTAUGH, JR  2,030,313
DEPOSITORY
Filed Oct. 3, 1934   9 Sheets-Sheet 8

INVENTOR
John J. Murtaugh Jr.
BY
Henry Van Arsdale
his ATTORNEY

Feb. 11, 1936.   J. J. MURTAUGH, JR   2,030,313
DEPOSITORY
Filed Oct. 3, 1934    9 Sheets-Sheet 9
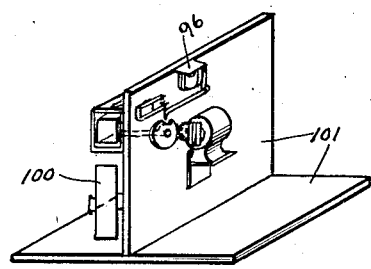
FIG.16
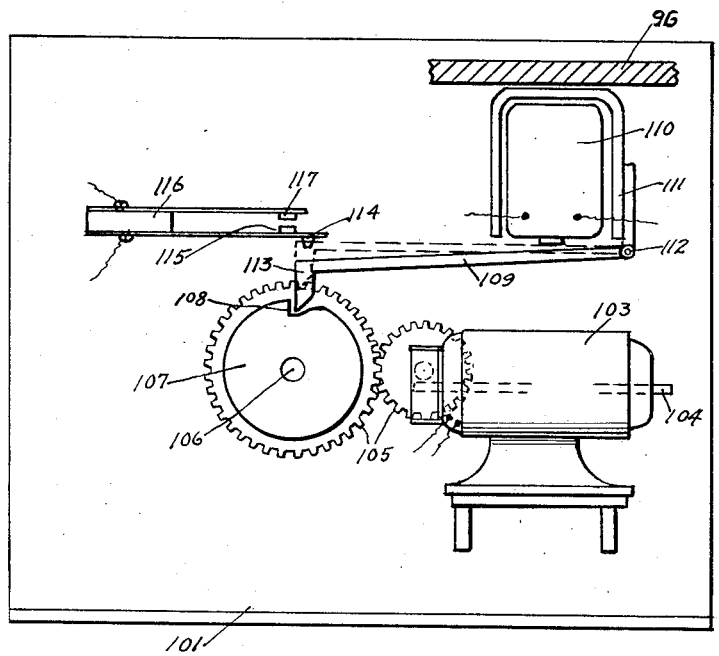
FIG.17
FIG.18
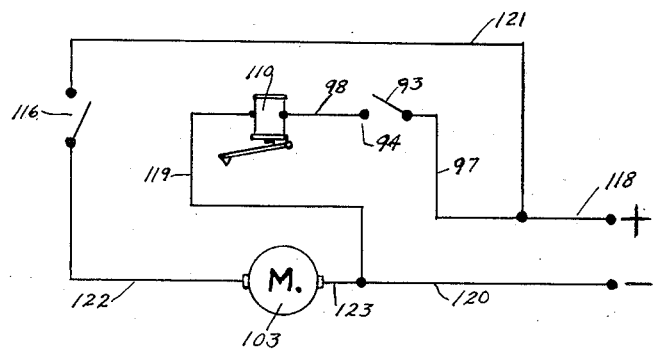
INVENTOR
John J. Murtaugh Jr
BY
Henry Van Arsdale
his ATTORNEY Patented Feb. 11, 1936

2,030,313

UNITED STATES PATENT OFFICE 2,030,313

DEPOSITORY

John J. Murtaugh, Jr., Floral Park, N. Y., assignor to Mosler Safe Co., Hamilton, Ohio, a corporation of New York Application October 3, 1934, Serial No. 746,645

20 Claims. (Cl. 234—1)

This invention relates to depositories, and more particularly to bank depositories which are continuously accessible, day and night, to receive deposits from the public. This general type of depository is well known. One of this type is shown in my prior Patent No. 1,949,283.

The principal object of this invention is to provide an improved construction, arrangement of parts and manner of operation which precludes improper or undesired operation and functioning of the mechanism in consequence of faulty or improper manipulation by a depositor or unauthorized person, and insures the certain and proper operation and functioning of the mechanism, and lessens the likelihood of any of the parts or mechanism getting out of order or the failure to operate properly and effectively at all times; and a further object of this invention is to provide a depository having these improvements and one which not only receives the deposits but also affixes individual identification to each deposit and also issues correspondingly identified receipts to the depositors.

Further objects of this invention include the provision of a depository of the character referred to and one in which means are provided which requires the deposit-receiving compartment to be cleared of all inserted matter and requires the deposited matter to be delivered positively into the chute leading to the safe storage compartment or chest, before a receipt for that inserted matter is issued by the depository, and means which preclude any subsequent operation of the deposit stamping (identifying) mechanism until the deposit already stamped has been removed from the reach of the stamping mechanism and has been delivered positively to the chute leading to the safe storage compartment or chest.

Other objects of this invention will be obvious from and will be in part pointed out in the description which follows and considered in connection with the accompanying drawings.

In accordance with this invention the deposit receiving compartment is closed by a latch adapted to be released from locking engagement by the weight of a proper coin or token dropped into an appropriate slot, the latch, however, holding the coin in operative association until the door is actually moved from closed position, and only then the operating coin or token, as well as all additional coins or tokens that may have been dropped into the coin slot subsequent to the preceding opening of the door, will drop through the depository into the safe storage compartment or chest, or such other receptacle as may be provided to harbor the coins or tokens.

The stamping mechanism is restricted to a single stamping operation for each time the door is moved from locked position, by means of mechanism associated with the door whereby full opening of the door causes a push button to be projected so it can be depressed by the depositor to stamp an inserted deposit, the push button, however, when once depressed is held so until the door is fully closed and latched, and is fully opened again thereafter, means also being associated with the door whereby closing movement of the door insures the proper discharge of the deposit from the deposit compartment and its delivery to the chute leading to the safe storage compartment or chest. Means are also provided whereby the passage of each deposit down the chute displaces an actuating member to cause actuation of the receipt issuing mechanism through means which limit the operation to the issuance of only a single receipt for each displacement of said actuating member, means being also associated with the door preventing such progress of the deposit as will cause such actuating displacement of the actuating member until the door is fully closed after the introduction of a deposit.

The invention accordingly consists in the features of construction, combination of elements and arrangement of parts which will be more fully pointed out hereinafter and the scope of the application of which will be indicated in the claims that follow; and in order that a clearer understanding of this invention may be had, attention is hereby directed to the accompanying drawings, forming a part of this application and illustrating certain possible embodiments of the invention, and in which:

Fig. 1 is a longitudinal sectional view of a depository installation embodying this invention, certain parts being indicated by dash lines;

Fig. 2 is a front elevation of the face of the depository;

Fig. 5 is a longitudinal sectional view of a portion of the upper compartment;

Fig. 6 is an elevation, partly broken away, of a detail including the actuating finger for the receipt issuing mechanism;

Fig. 7 is a sectional view of the compartment, a portion of the face plate being shown;

Fig. 8 is a perspective view of the back of the small depositing door showing the deposit displacing bar attached;

Fig. 9 is a perspective view of the plunger (push) button for the stamping mechanism;

Fig. 10 is an elevation of the deposit door latch, a portion of the coin drop being shown in section and a coin in latch raising engagement being indicated by dash lines;

Fig. 16 is a perspective view, to small scale, of the receipt issuing mechanism;

Fig. 17 is an elevation of the right side of the receipt issuing mechanism;

Fig. 18 is a diagram of the electrical wiring used in conjunction with the motor and receipt mechanism, to operate same, and Fig. 19 is a diagram of the electrical wiring associated with the switches associated with the deposit door and push button plunger.

Similar reference characters refer to similar parts throughout the several views of the drawings.

Figure 3:
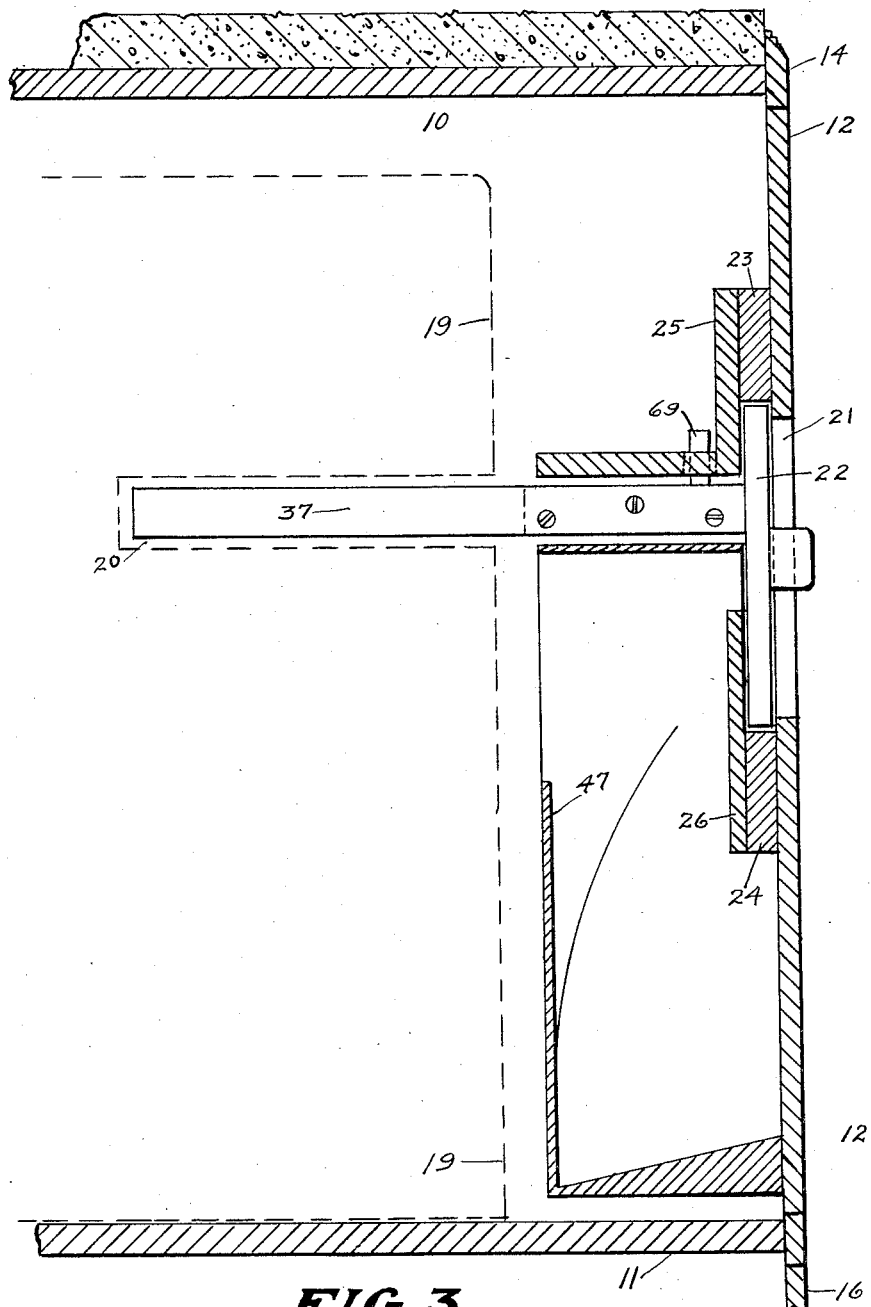
Fig. 3 is a longitudinal section, to larger scale, through the upper compartment of the depository.
Figure 4:
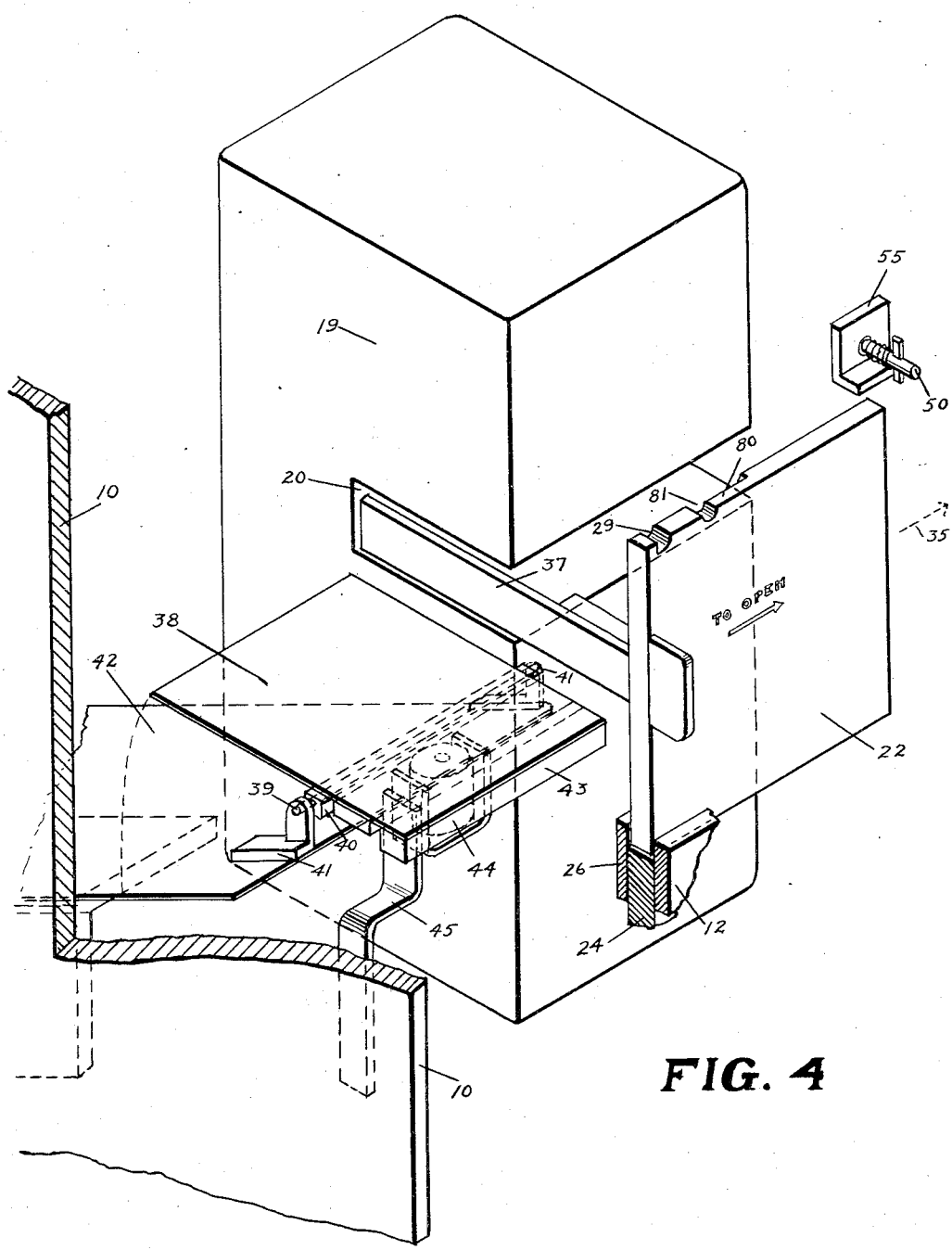
Fig. 4 is a perspective view of certain details of the construction.
Figure 12:
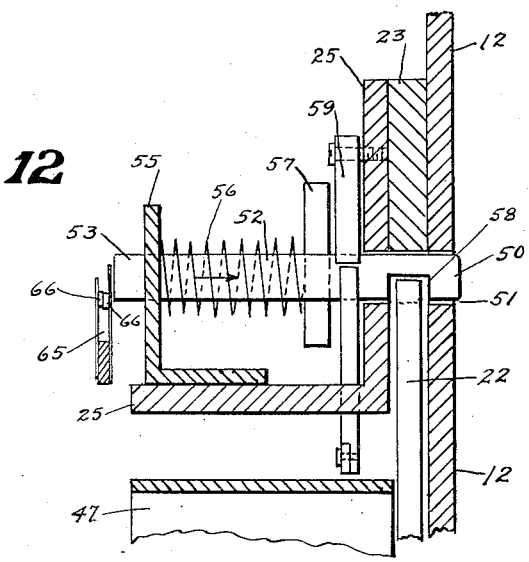
Fig. 12 is a sectional view of a portion of the structure adjacent the push button plunger.
Figure 11:
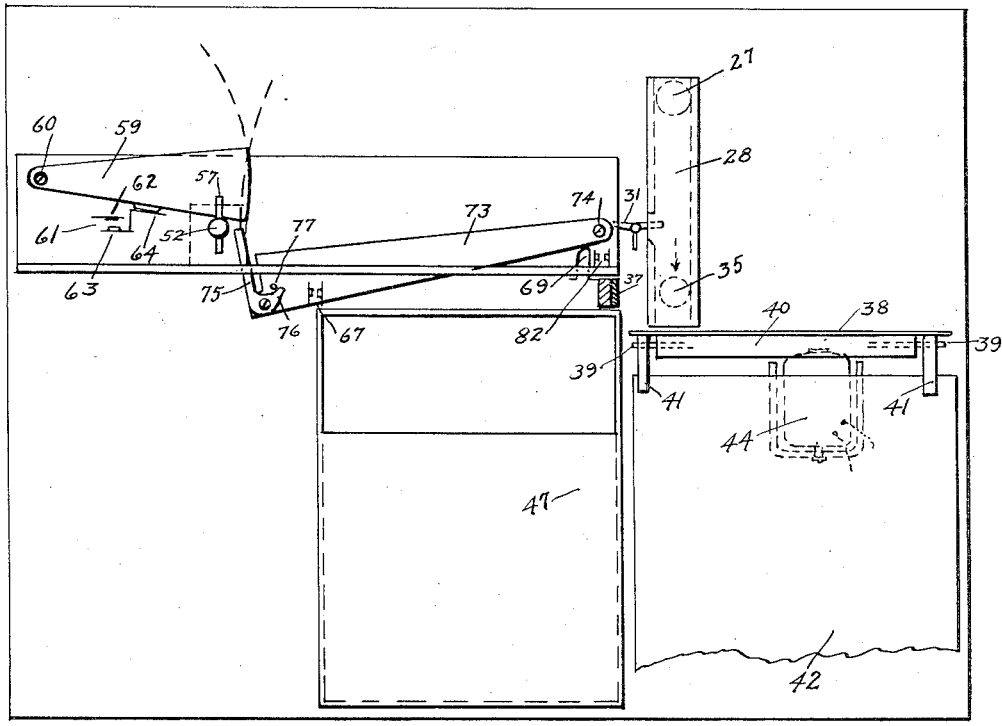
Fig. 11 is an elevation of the inside of the entire large door of the upper compartment, and a portion of the deposit chute or slide.
Figure 13:
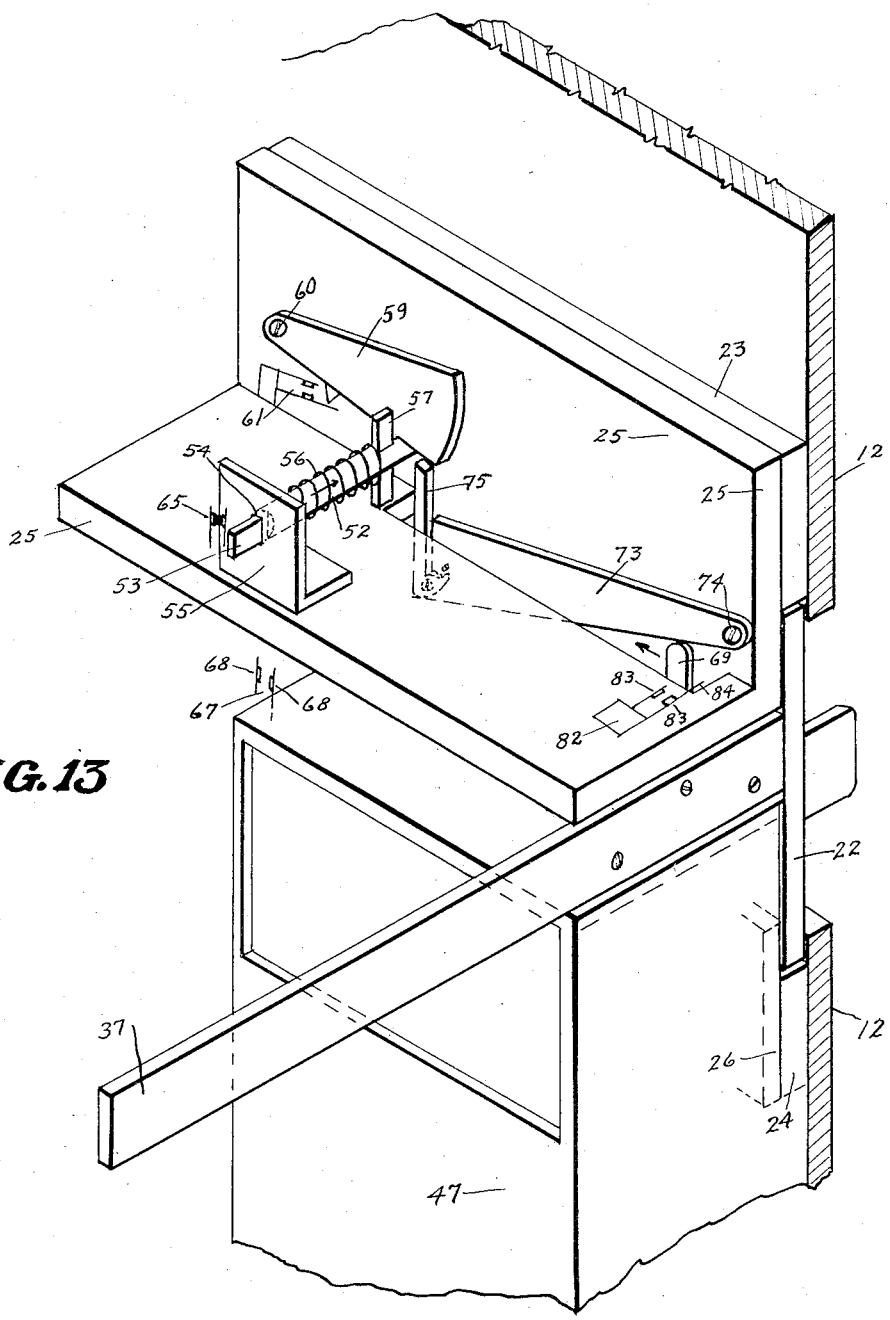
Fig. 13 is a perspective view of a part of the inside of the large door compartment.
Figure 14:
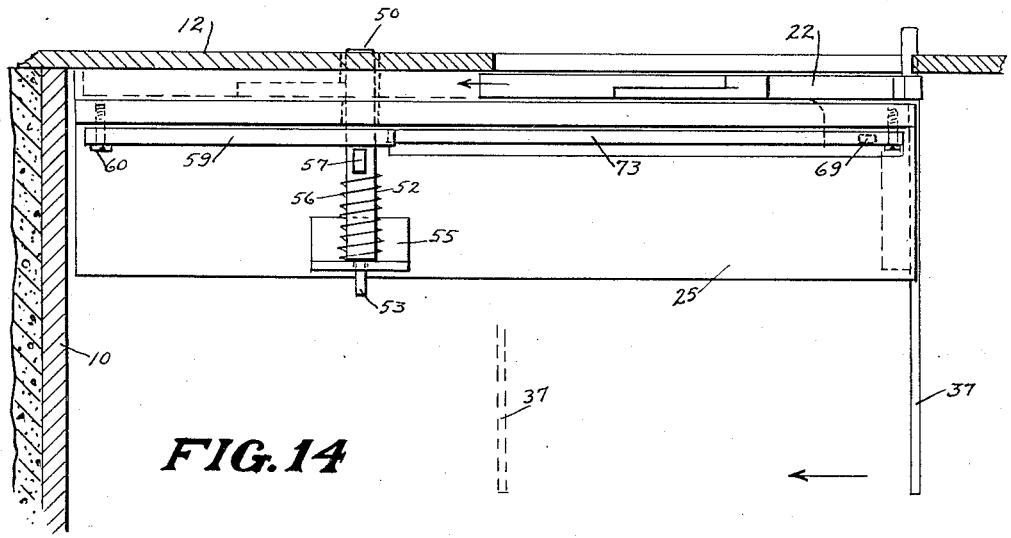
Fig. 14 is a sectional view of a portion of the construction at the deposit door.

Referring to the drawings, it will be seen that in Fig. 1 the depository is shown disposed in the wall 1 of the building, the sidewalk being indicated at 2, and the interior floor of the building at 3.

The depository includes the usual safe storage chest 4, equipped with the usual door 5. The top of the chest is provided with an aperture 6 through which the deposited matter falls into the chest. In proper relation to this aperture, and within the chest, is mounted a suitable guard plate 7, which prevents withdrawal of matter upwardly through the aperture 6, and a metal plate 8 is also mounted in the chest to deflect deposits toward the front for convenience of removal through the door 5.

Mounted in the wall 1, above the chest 4, is a steel cabinet having walls 10 which houses the mechanism for stamping and delivering properly entered deposits to the chest 4, and also houses mechanism for issuing receipts at proper times to the depositors. Cabinet 10 communicates with the interior of chest 4 through a chute 9. Cabinet 10 is provided with a horizontal partition 11 extending from the front inwardly a part way. Above this partition, the cabinet is provided with a door 12, hinged as at 13, to the architrave 14, and is provided with a suitable key lock 15. Below partition 11 the cabinet is provided with a door 16, suitable hinged to the architrave 14, as at 17, and provided with a suitable key lock 18.

Mounted on the partition 11 is a stamping mechanism, generally indicated at 19, which may be of any usual electrically controlled type, and has a receiving aperture 20 for receiving the matter to be stamped thereby, facing an aperture 21 in the door 12. A slide door 22, mounted against the rear of door 12 to slide between upper and lower batten bars 23 and 24 is provided to open and close this opening, the door being held against inward movement by an angle member 25 secured to the batten 23 and by a batten strip 26 secured to batten bar 24.

Door 12 is also provided with a coin aperture 27, which leads to a coin slot formed against the inside of the door by a suitable channel piece 28. The top edge of door 22 is provided with a notch 29 which is adapted to engage the head 30 of a latch member 31, which is pivoted to the door 12 on a suitable pin or stud 32 between the door aperture and the slide 28. Latch 31 has a tail 33 projecting through an aperture 34 in the slide 28 so as to be engaged and depressed by a coin 35 falling through the slide 28, so as to disengage the latch head 30 from the door notch 29 and allow the door to be slid open. The latch 31 is provided with an extension 36, which strikes against the front edge of the door when fully closed, and holds the latch tail 33 sufficiently elevated to prevent the coin 35 from passing by and further down the slot until the door has been slid open to some extent, this door movement allowing further pivoting of the latch extension 36 and tail 33 and the unblocking of the coin 35, which then freely passes down the slot 28, together with all additional coins that may be in the slot and held back by the coin 35.

To the rear of door 22 is rigidly affixed a displacement bar 37 and which, when the door is fully opened, rests within and along one side of the stamping slot 20 of the stamping mechanism. As door 22 is closed, it slides bar 37 transversely across the stamping aperture 20 and ejects all material therein and deposits it on a swinging plate 38 of butterfly type pivoted by pin 39 carried on a member 40 secured to the underside of plate 38 and journalled in suitable lugs or brackets 41 carried on a slide plate 42 supported on the side wall 10 alongside of the stamping unit 19. Plate 38 is weighted as at 43 so that it will normally be self-inclining toward the slide 42, but will require the application of only a slight force to bring it to horizontal position. This is accomplished by means of an electromagnet 44 supported by a suitable bracket 45, which is secured to the adjacent side wall 10 of the cabinet.

The stamping mechanism is set in operation to perform one stamping operation only each time a depositor outside of the depository depresses a plunger push button which has a head 50 slidably disposed in an aperture 51 provided therefor in the door 12, and has a cylindrical shank portion 52 slidably seated in a suitable aperture therefor provided in the angle piece 25 and has a straight sided rear end portion 53 slidably seated in a corresponding aperture 54 provided therefor in an angle bracket 55 supported on the base of angle member 25, whereby the plunger is prevented from turning. A coil spring 56 surrounding the plunger and compressed between angle 55 and a cross piece 57 mounted on the plunger tends to displace the plunger so that its head 50 will be projected outside of the door 12 and in position to be depressed by a depositor. This plunger has a plurality of functions and serves a plurality of purposes, as will become apparent as the description proceeds. The plunger is normally held depressed by the engagement of the top of the door 22, in a slot 58 provided therefor in the plunger, and also by a stop plate 59 which is pivoted to the angle member 25 as by stud or screw 60 and seats in advance of and is an abutment for the cross piece 57 of the plunger.

The stamping unit circuit includes in series three electric switches, one being a self-closing switch 61 having a stationary contact 62 and a movable contact 63 having an extension 64 adapted to be engaged by the pivoted arm 59, and when the arm is in lowered position it holds the switch 61 open. One of the other switches is of the self-opening type 65, having a pair of contacts 66, of which one is adapted to be engaged by the rear end 53 of the plunger push button when in retracted position to hold the switch closed. The third switch 67 is of the self-opening type having contacts 68, adapted to be engaged and brought together by the displacement bar 37 when the door 22 is fully open, to close this switch. These switches are shown somewhat diagrammatically in the drawings as it is understood that they may be of any ordinary construction and may be secured in any common manner to suitable adjacent parts of the structure, it being deemed unnecessary to complicate the drawings by a more detailed showing of the construction and mounting.

Figure 15:
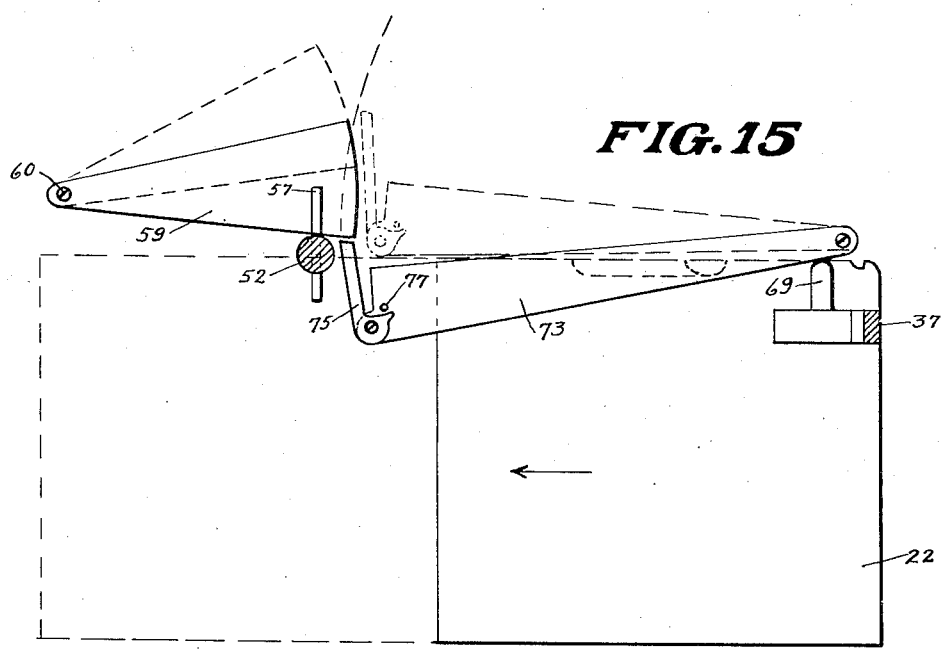
Fig. 15 is an elevation of the structure parts shown in Fig. 14.

As stated, the door 22 is normally latched closed by the coin latch 31. When a depositor desires to make a deposit he drops the proper coin or token into the coin aperture 27 and the coin falls down slot 28, depressing the latch tail 33 sufficiently to release the door. The depositor then slides the door 22 to open position. As the door slides open, a cam finger 69 slides along the bottom edge of a cam plate 73, which is pivoted to the angle member 25 as by a pin or screw 74. Pivotally mounted on the free end of plate 73 is an upwardly extending finger 75 which is disposed beneath the free end of the pivoted arm 59. Pin 75 has a heel 76 adapted to engage a pin 77 on the plate 73, whereby pivotal movement of finger 75 is restricted. As the door is slid open, the engagement of finger 69 with the lower edge of arm 73 causes arm 73 to rise, and through the raising of finger 75 also raises pivoted plate 59 to unblock the cross-piece 57 of the push button plunger. This unblocking occurs when the door has been slid to a predetermined partly opened position and at about the same time an elongated slot 80 cut partly through the upper edge of door 22 allows the push button plunger to spring forward to the extent of the width of this slot, and a sufficient distance to allow the contacts 66 of the switch 65 to spring apart. The end of slot 80 is cut entirely through the upper edge of the door as at 81, this end notch 81 being so disposed that when the door is fully opened, the push button plunger is moved to extreme projected position by the spring 56. During the engagement of the push button plunger in the slot 80, the finger 69 has raised the arm 73 and finger 75 to such an extent that the finger 75 slips from under the arm 59 (as shown by dash lines in Fig. 15) and arm 59 falls, but strikes and is held up by the top edge of the plunger cross-piece 57. The raising of arm 59 allows the contacts of switch 61 to come together and the switch to be closed, and the stopping of the fall of arm 59 by the cross-piece 57 prevents the arm 59 from opening switch 61 when it is released from the finger 75. When the push button plunger is projected, it so engages in the notch 81 that closing movement of the door is prevented until the plunger is fully depressed, whereupon bringing the notch 58 therein into alignment with the door shoulder at the door notch 81. When the door is moved into full open position the switch 67 is closed by the displacement bar 37.

Accordingly, as a depositor is opening the door 12 to make a deposit, switch 61 closes but switch 67 is still open. When door 12 is about half way open, arm 59 has been raised sufficiently to allow the plunger button 50 to spring forward, and this plunger movement causes switch 65 to open. When the door is all the way open, displacement bar 37 engages switch 67 and closes it so that when door 22 is in fully open position, switches 61 and 67 are closed, but switch 65 is open and the circuit to the stamping unit is still broken at switch 65. Actuation of the stamping mechanism is caused by the depositor pressing the plunger button inwardly, which he must do in order to so release the door from the plunger that the door may be closed. By depressing the plunger button to the required extent, switch 65 is closed thereby, thus completing the circuit to the stamping unit and setting it in operation. This circuit, however, is closed only momentarily since the circuit is almost immediately broken because depression of the plunger button withdraws its cross-piece 57 from beneath the arm 59, and results in the dropping of arm 59 upon the plunger and the opening of switch 61, thus again opening the circuit.

As the door is slid to closed position, the arm 73 lowers and the finger 75 thereon slides across the free edge of the arm 59. However, not until the door is fully closed does the finger 75 lower far enough to fall underneath arm 59. Therefore, until the door becomes fully closed, it may be moved back and forth at will, without causing any actuation of the stamping mechanism since switch 61 will remain open until the door has been moved from fully opened to fully closed position. Just as soon as the door has been moved to fully closed position, it will be reengaged and held closed by latch 31.

A container 47 is disposed between the door 12 and the stamping unit below the door 22 and adapted to contain a supply of deposit envelopes which may be removed from the receptacle for use when the sliding door 22 is opened.

The depositor having opened the door and inserted the deposit in the stamping aperture of the stamping unit 19, and having depressed the plunger button 50 to actuate the stamping mechanism to stamp the deposit, by closing the door causes the displacement finger 37 to slide the deposited matter on to the platform plate 38, which is then being held in horizontal and deposit receiving position by the magnet 44. This magnet is included in an electrical circuit with a switch 82 of the self-closing type having contacts 83, of which one has an extension 84 adapted to be engaged and displaced by the finger 69 to hold the contacts apart and the switch 82 open when the door is in fully closed position. At the beginning of the door opening movement finger 69 allows switch 82 to close, thus causing magnet 44 to be energized to draw and hold plate 38 in horizontal position. When the door is again fully closed, the finger 69 opens switch 82, causing magnet 44 to be deenergized and plate 38 will thereupon tilt forward and the deposit will slide therefrom on to and down the slide plate 42, through the chute 9 and into the safe storage chest 4.

In its progress from the plate 38 into the deposit chest, the deposit strikes against and displaces a baffle finger 90 which is pivoted on a stud or pin 91 supported on a bracket 92 of non-conducting material secured to the underside of partition 11. An electric switch contact finger 93 is mounted on finger 90 so as to swing therewith and to make contact with a contact 94, supported by an insulating block 95 secured to the underside of partition 11, when finger 90 is displaced by a passing deposit sliding down plate 42. The finger 90 is suitably balanced to maintain itself normally in elevated position to be contacted and depressed by a deposit passing by.

Through contacts 93 and 94, finger 90 controls a circuit whereby suitable receipt issuing mechanism is caused to operate to issue a single receipt, and no more, for each time the finger 90 is displaced by a deposit. The receipt issuing mechanism is generally indicated at 100 and may be of any suitable commercial type. This unit and the operating means therefor may be supported on a suitable stand or framework 101 housed in cabinet 10 beneath the partition 11. The door 16 is provided with a suitable aperture 102, through which the receipt mechanism is adapted to deliver issued receipts to the depositors.

The receipt issuing mechanism is driven by a suitable motor 103 having a shaft 104 connected through suitable driving gearing 105 to the main shaft 106 of the mechanism. A cam disc 107 having a single notch 108 is mounted on shaft 106 and coacts with an armature 109 of an electromagnet 110, which may be supported in a suitable frame 111 attached to a bracket 96 fastened on the framework 101. One end of armature 109 is pivotally connected to frame 111 as at 112, and the other end of armature 109 has a head 113.

When magnet 110 is energized, it lifts armature 109 and not only raises the head 113 out of the notch 108 of the cam 107, but also raises the head against an extension 114 of contact 115 of a self-opening switch 116 and closes this contact against the other contact 117 of the switch to close the circuit therethrough. Switch 116 controls the circuit through the motor 103 and the switch contacts 93 and 94 control the energization of magnet 110.

The circuits are as follows (see Fig. 18):—A conductor 118 from one side of a suitable source of current supply has one branch 97 leading to contact 93 and conductor 98 leads from contact 94 to magnet 110, from whence conductor 119 leads to conductor 120, which is connected to the opposite side of the current supply. Another branch 121 from conductor 118 leads to one contact of switch 116 and conductor 122 leads to the motor 103, from whence conductor 123 joins conductor 120.

Thus it will be seen that each time finger 90 is displaced by a deposit, contacts 93 and 94 will be closed and the electromagnet 110 energized momentarily, but sufficient to cause the head 113 of armature 109 to be raised out of the cam notch 108 and switch 116 to be closed to start the motor 103 so that when contacts 93 and 94 open the motor will have rotated shaft 106 to bring the raised portion of cam 107 beneath the armature head 113, thus holding switch 116 closed until shaft 106 has made one complete revolution, whereupon the dropping of head 113 into the cam notch 108 causes switch 116 to open and the motor to stop. The receipt issuing mechanism is so designed that one such complete rotation of the shaft causes the issuance of a single receipt.

The intended manner of using the depository and its operation will be clear from the above description. Actuation of the stamping mechanism requires the deposit door to be in extreme open position. A second actuation is prevented until after the door has been fully closed and again returned to extreme open position. For each actuation the stamping mechanism goes through one stamping operation only. Closing movement of the door from extreme position cannot be had until the stamping mechanism has been actuated. The door is normally locked by the coin releasable latch in fully closed position. After the door has been moved from fully closed position to about a half way open position it cannot be fully closed until after it has been fully opened and the stamping mechanism has then been actuated. However, thereafter the door may be moved back and forth at will so long as it is not fully closed, but no receipt will be issued until the door is fully closed. Actuation of the receipt issuing mechanism requires the passing of a deposit through the depository and the pivoted barrier plate which receives the deposit when ejected from the stamping unit prevents the deposit from passing through the depository until the door is fully closed whereupon this barrier releases the deposit to actuate the receipt issuing mechanism. Each actuation of the receipt issuing mechanism results in the issuance of only a single receipt and each actuation requires a separate deposit to pass through the depository. For a depositor to receive a receipt requires him to have properly operated the depository and the depository will not operate improperly irrespective of whether the depositor has neglected to operate the depository in the proper and intended manner or not.

As many changes could be made in the above construction and as many apparently widely different embodiments of the invention could be made without departing from the scope thereof, it is understood that all matter contained in the above description or shown in the accompanying drawings shall be interpreted as illustrative and not in a limiting sense.

What I claim is:—

1. In a depository of the character described having a receiving slot and a door therefor, in combination, a device for stamping a deposited object, operating means therefor including an actuating member displaceable to a predetermined actuating position to cause operation of the stamping device to stamp a deposit, and means associated with the door whereby said member is held in said actuating position when the door is fully closed, means displacing said member to one non-actuating position when the door is moved to a predetermined partly open position and to another non-actuating position when the door is moved to fully open position and means whereby after said actuating member is returned to said actuating position said member is held in that position until after the door has been fully closed and has been returned to said partly open position.

2. In a depository of the character described, having a receiving slot and a door therefor, in combination, a device for stamping a deposited object, operating means therefor including a starting member manually displaceable to a predetermined position to cause operation of the stamping device to stamp a deposit, means associated with the door whereby said member is held out of manually displaceable position except when the door is fully open, and means for moving said member into manually displaceable position when the door has been moved from fully closed position to fully open position.

3. In a depository of the character described, having a receiving slot and a door therefor, in combination, a device for stamping a deposited object, operating means therefor including a starting member manually displaceable to a predetermined position to cause operation of the stamping device to stamp a deposit, means associated with the door whereby said member is held out of manually displaceable position except when the door is fully open, means for moving said member into manually displaceable position when the door has been moved from fully closed position to fully open position, and means associated with said door and starting member whereby the door is locked against closing movement while said member is in said manually displaceable position.

4. In a depository of the character described, having a receiving slot and a door therefor, in combination, a device for stamping a deposited object, operating means therefor including a starting member manually displaceable to a predetermined position to cause operation of the stamping device to stamp a deposit, means associated with the door whereby said member is held out of manually displaceable position except when the door is fully open, means for moving said member into manually displaceable position when the door has been moved from fully closed position to fully open position, and means associated with said door and starting member whereby the door is locked against closing movement while said member is in said manually displaceable position, and whereby displacement of the starting member into starting position releases the door for closing movement.

5. In a depository of the character described, having a receiving slot and a door therefor, in combination, a device for stamping a deposited object, an electric operating circuit therefor including a switch and a member manually displaceable to close said switch to close said circuit, and means associated with said door and switch controlling said circuit whereby said circuit is held open irrespective of the open or closed condition of said switch except after the door has been moved from fully closed to fully open position and said switch closed by manual displacement of said member.

6. In a depository of the character described, having a face member provided with a receiving slot and a sliding door therefor, in combination, a device for stamping a deposited object, actuating means for said device, and controlling devices for said actuating means, said devices including a plunger disposed in the path of the upper edge of the door, penetrating the face member and manually displaceable inwardly thereof, means for moving the plunger outwardly, said door edge riding in a notch in the plunger whereby said plunger is maintained in an inward position, and said door edge having a notch adapted to be moved into alignment with the plunger to permit outward movement of the plunger, said control devices operating to cause actuation of the stamping device upon full manual displacement of said plunger inwardly.

7. In a depository of the character described, having a face member provided with a receiving slot and a sliding door therefor, in combination, a device for stamping a deposited object, actuating means for said device, and controlling devices for said actuating means, said devices including an electric control circuit having a plurality of switches, a plunger disposed in the path of the upper edge of the door, penetrating the face member and manually displaceable inwardly thereof, means for moving the plunger outwardly, co-acting means associated with the door and plunger whereby all said switches are closed when the door has been moved from fully closed position to fully open position and the plunger is manually displaced fully inwardly.

8. In a depository of the character described, having a face member provided with a receiving slot and a sliding door therefor, in combination, a device for stamping a deposited object, actuating means for said device, and controlling devices for said actuating means, said devices including an electric control circuit having a plurality of switches, a plunger disposed in the path of the upper edge of the door, penetrating the face member and manually displaceable inwardly thereof, means for moving the plunger outwardly, co-acting means associated with the door and plunger whereby all said switches are closed when the door has been moved from fully closed position to fully open position and the plunger is manually displaced fully inwardly, and means including a member combined with the plunger to move when the plunger is moved fully inwardly whereby one of said switches is opened promptly thereafter to break the circuit.

9. In a depository of the character described, having a face member provided with a receiving slot and a sliding door therefor, in combination, a device for stamping a deposited object, actuating means for said device, and controlling devices for said actuating means, said devices including an electric control circuit having a plurality of switches, a plunger disposed in the path of the upper edge of the door, penetrating the face member and manually displaceable inwardly thereof, means for moving the plunger outwardly, co-acting means associated with the door and plunger whereby all said switches are closed when the door has been moved from fully closed position to fully open position and the plunger is manually displaced fully inwardly, said co-acting means including a moveable plate associated with one of said switches normally maintaining the switch closed, a member movable with the door and means connecting said member to said plate whereby upon opening movement of the door said plate is raised to close said switch and adapted when the door is opened to a predetermined extent to sever the connection, and a member movable with the plunger and adapted to engage said plate and to maintain the plate out of switch closing position, manual displacement of the plunger fully inwardly releasing said plate to engage and close said switch.

10. In a depository of the character described, having a face member provided with a receiving slot and a sliding door therefor, in combination, a device for stamping a deposited object, actuating means for said device, and controlling devices for said actuating means, said devices including an electric control circuit having a plurality of switches, a plunger disposed in the path of the upper edge of the door, penetrating the face member and manually displaceable inwardly thereof, means for moving the plunger outwardly, co-acting means associated with the door and plunger whereby all said switches are closed when the door has been moved from fully closed position to fully open position and the plunger is manually displaced fully inwardly, said co-acting means including a member movable with the door and associated with one of said switches whereby said member engages and closes said switch when the door is in fully open position, said switch being open when the door is displaced from said position.

11. In a depository of the character described, having a receiving slot and a door therefor, in combination, a device for stamping a deposited object, operating means therefor including an actuating member displaceable to a predetermined position to cause operation of the stamping device to stamp a deposit, means associated with the door controlling displacement of said member and whereby displacement of said member into said actuating position requires the door to be fully open and to have been moved to said fully open position from fully closed position, and a releasable locking device whereby the door is locked in closed position.

12. In a depository of the character described, having a receiving slot and a door therefor, in combination, a stamping unit having a passage therethrough and adapted to stamp an object disposed in said passage, a safe storage chest, members forming a deposit passageway from the exit end of said passage into the safe storage chest, means, including a movable barrier member adjacent the exit end of said passage adapted to arrest and retain an object discharged from said passage, means controlled by the door whereby movement of the door from open to closed position discharges an object from said passage onto said barrier member, and means controlled by the door whereby said barrier member is disposed and held in object retaining position when an object is discharged from said passage, until the door is fully closed, said barrier then discharging said object into said deposit passageway.

13. In a depository of the character described, having a receiving slot and a door therefor, in combination, a device for stamping a deposited object, operating means therefor, including a starting member movable from a certain position in which it is engageable by an operator to a predetermined starting position to cause operation of the stamping device to stamp a deposit, and means associated with the door maintaining said member out of said engageable position except when the door is fully open.

14. In a depository of the character described, having a receiving slot and a door therefor, in combination, a device for stamping a deposited object, operating means therefor, including a starting member movable from a certain position in which it is engageable by an operator to a predetermined starting position to cause operation of the stamping device to stamp a deposit, means associated with the door maintaining said member out of said engageable position except when the door is fully open, and means for placing said member in said engageable position when the door is fully open.

15. In a depository of the character described, having a receiving slot and a door therefor, in combination, a device for stamping a deposited object, operating means therefor, including a starting member movable from a certain position in which it is engageable by an operator to a predetermined starting position to cause operation of the stamping device to stamp a deposit, means associated with the door maintaining said member out of said engageable position except when the door is fully open, means for placing said member in said engageable position when the door is fully open, and stop means adapted to operatively engage said starting member when displaced from said engageable position for holding said member against return to said engageable position until the door has been fully closed and then returned to a predetermined open position.

16. In a depository of the character described, having a receiving slot and a door therefor, in combination, a device for stamping a deposited object, operating means therefor, including a starting member movable from a certain position in which it is engageable by an operator to a predetermined starting position to cause operation of the stamping device to stamp a deposit, means associated with the door maintaining said member out of said engageable position except when the door is fully open, means for placing said member in said engageable position when the door is fully open, stop means adapted to operatively engage said starting member when displaced from said engageable position for holding said member against return to said engageable position until the door has been fully closed and then returned to a predetermined open position, and disengaging means for said stop means, associated with the door whereby after the door has been fully closed and then moved to a predetermined open position, said stop means is disengaged from the starting member.

17. In a depository of the character described, having a receiving slot and a door therefor, in combination, a device for stamping a deposited object, operating means therefor, including a starting member movable from a certain position in which it is engageable by an operator to a predetermined starting position to cause operation of the stamping device to stamp a deposit, means associated with the door maintaining said member out of said engageable position except when the door is fully open, means for placing said member in said engageable position when the door is fully open, stop means adapted to operatively engage said starting member when displaced from said engageable position for holding said member against return to said engageable position until the door has been fully closed and then returned to a predetermined open position, and disengaging means for said stop means, associated with the door and adapted to operatively engage the stop means on movement of the door to fully closed position and to disengage from the stop means when the door is moved to fully open position, for disengaging the stop means from the plunger when the door has been fully closed and then moved to a predetermined open position.

18. In a depository of the character described, having a receiving slot and a sliding door therefor, in combination, a device for stamping a deposited object, operating means therefor, including a starting plunger movable from a certain position in which it is engageable by an operator to a predetermined starting position to cause operation of the stamping device, said door engaging and holding the plunger out of said engageable position except when the door is fully open.

19. In a depository of the character described, having a receiving slot and a sliding door therefor, in combination, a device for stamping a deposited object, operating means therefor, including a starting plunger movable from a certain position in which it is engageable by an operator to a predetermined starting position to cause operation of the stamping device, said door engaging and holding the plunger out of said engageable position except when the door is fully open, and a stop member automatically engaging the plunger when moved out of said engageable position blocking return movement of the plunger to engageable position.

20. In a depository of the character described, having a receiving slot and a sliding door therefor, in combination, a device for stamping a deposited object, operating means therefor, including a starting plunger movable from a certain position in which it is engageable by an operator to a predetermined starting position to cause operation of the stamping device, said door engaging and holding the plunger out of said engageable position except when the door is fully open, a stop member automatically engaging the plunger when moved out of said engageable position blocking return movement of the plunger to engageable position, and control means for disengaging said stop member from the plunger when the door has been moved from fully closed position to a predetermined open position, said control means including a pivoted control member, an actuating member movable with the door whereby the control member is moved in accordance with movement of the door, and a device disengageably connecting the control member and stop member, whereby said members are connected when the door is moved to fully closed position and said members are disconnected when the door is fully open.

JOHN J. MURTAUGH, Jr.